G. W. GREEN.
VARIABLE DIAMETER BRACE BIT FOR BORING WOOD.
APPLICATION FILED AUG. 4, 1910.
994,457.
Patented June 6, 1911.
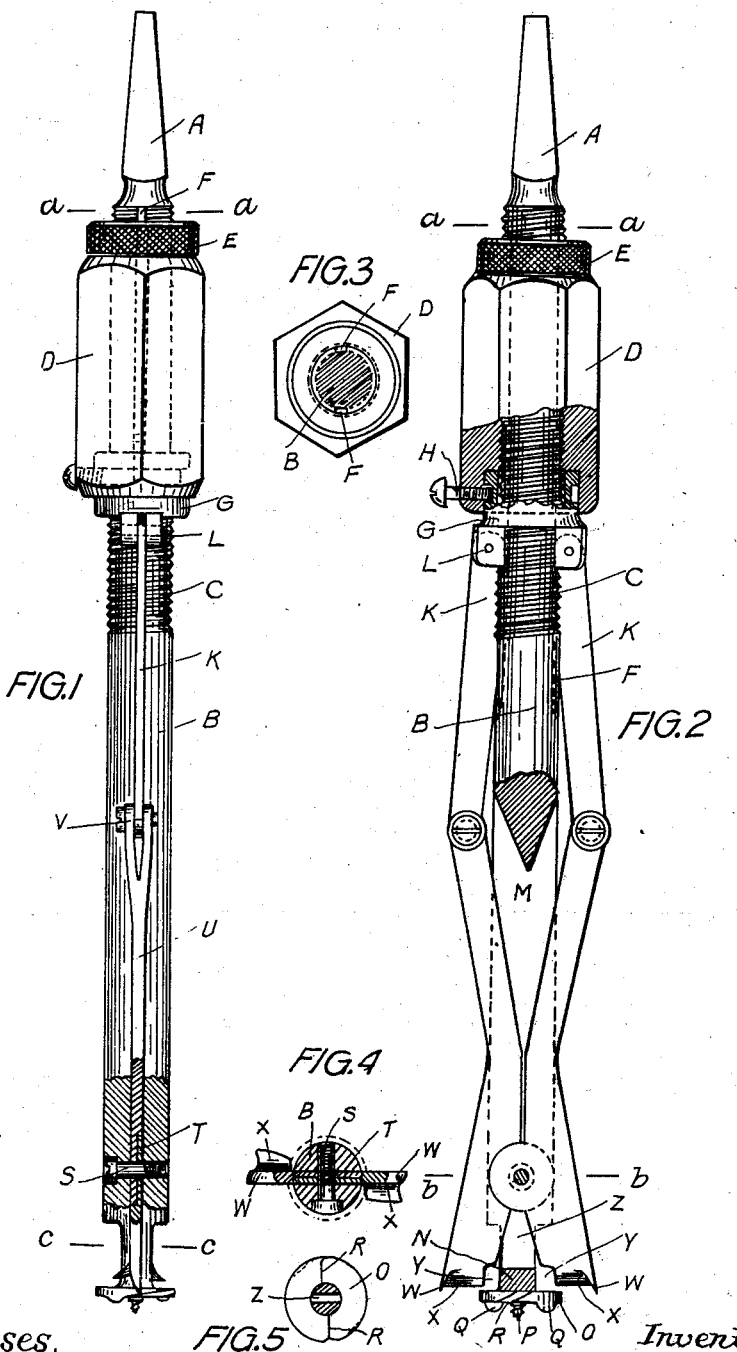
Witnesses,
Inventor,
George William Green.
By his Attorney

UNITED STATES PATENT OFFICE.

GEORGE WILLIAM GREEN, OF BOBIN, NEW SOUTH WALES, AUSTRALIA.

VARIABLE-DIAMETER BRACE-BIT FOR BORING WOOD.

994,457.  Specification of Letters Patent.  Patented June 6, 1911.

Application filed August 4, 1910.  Serial No. 575,569.

*To all whom it may concern:*

Be it known that I, GEORGE WILLIAM GREEN, a subject of the King of Great Britain and Ireland, and residing at "The Gunyah," Via Wingham, Bobin, in the State of New South Wales, Commonwealth of Australia, have invented new and useful Improvements in Variable-Diameter Brace-Bits for Boring Wood.

My invention relates to wood boring brace bits of that class in which adjustable cutters are provided to adapt the bit for boring parallel side holes of any certain diameter within a limited range, and for boring holes of truncated conical section to receive tenons or inserted parts, to be secured in such holes by means of fox wedges. In carrying out my said invention the shank of the bit is provided with a gimlet point disk auger boring end and a brace chuck stock; its upper part of the shank is screwed to carry a tapped collar and its lower part above the auger disk is slotted through. A pair of expanding wing cutters with bent lever legs are fulcrumed in said slot; these cutters are of the edge nib and peeling lip type, the lips being curved and located to take the chips lifted by the auger disk when the wing cutter is closed in to overlie said disk when boring holes of less than the maximum diameter. The levers which form the upper extensions of the wing cutters are articulated to a running collar carried by the tapped adjusting nut or collar which runs on the screwed upper part of the bit shank.

In the accompanying drawings, Figures 1 and 2 are sectional elevations, Fig. 3 is a cross section on lines $a$—$a$ of Figs. 1 and 2; Fig. 4 is a cross section on line $b$—$b$ of Fig. 2; and Fig. 5 is a cross section on line $c$—$c$ of Fig. 1.

In Fig. 5 the adjustable wing cutters are not shown.

A is a brace chuck stock, and B the bit shank. The upper part of the shank B is screwed as shown at C to carry a long tapped collar D, made hexagonal or octagonal exteriorly to provide an efficient hand grip for turning it on the shank B. A knurled edge binding nut E also running on the thread C is provided to lock the collar D on the shank B when required. Keyways F are cut longitudinally in the upper end of the shank B. The lower end of the collar D is recessed to carry the sleeve G which is rotatable within it, but is locked against endwise movement by a screwed feather pin H. The connecting rods K are pivotally connected at their upper ends to the lugs L of the sleeve G. These rods K fit in the keyways F and so prevent rotation of the sleeve G in relation to the shank B. The position of the sleeve G on the screwed shank is set by rotating the collar D, fixing it when necessary by means of the binding nut E. The lower end of the shank is slotted through as shown at M, the keyways F alining with said slot, but is left solid as shown at N at the extreme lower end to reinforce the disk auger O. This auger has a gimlet point P, edge nibs Q for circling out the auger cut, and peeling lips R, which latter are radial to the axis of the bit and extend inward on the under side of the disk, up to the edge of the gimlet point P, and on the upper side of the disk to the solid stub N.

S is a cross pin, passing through the slot M and forming the fulcrum for the expanding wing cutters. Where these cutters are carried on the pin S they are formed with overlapping disk cheeks T which are halved as shown. Their upper extensions U form levers which are articulated at V through the connecting rods K to the sleeve G as shown in Figs. 1 and 2. Their lower extensions carry edge nibs W for edging the outer cut, which encircles the auger cut which is made by the parts Q and R and they also carry peeling lips X. Clearance is provided, as shown at Y, for the stub N and at Z to allow the cutters to be moved inward to reduce the diameter of the hole cut by them. The peeling lips X are almost level with the upper side of the auger disk O when the wing cutters are retracted, but they lift a little above that level when spread as shown in Fig. 2. The leading edges of these lips are positioned with reference to the peeling lips R of the auger so that they will receive the chips raised by said lips R forming substantially a part of the same helices in which the said peeling lips of the auger are located. The wing cutters must never be expanded so far as to leave an annular "land" of uncut wood around the auger boring. The diameter of the shank B is reduced as shown at its lower end immediately above the auger.

The hole is bored in two levels, the inner cut made by the auger being a little deeper than the surrounding annular widening cut made by the expanding wing cutters.

For boring a cylindrical hole, the wing cutters are set with their edge nibs Q to the diameter required, by screwing the collar D up or down on the screwed shank to spread or retract the lower ends U of the cutters; then the binding nut E is screwed home to fix the collar D. Having set the cutters in this manner, the tool is used as an ordinary brace bit.

For boring a hole having a diameter larger at the bottom than at the mouth, the binding nut E is run back and the collar D set to hold the cutter wings to the mouth diameter. As the boring proceeds, the collar is grasped to hold it from rotating at the same rate as the shank, whereby it is caused to move upwardly on the shank, thus drawing in the wing cutter levers U and consequently spreading the cutters, causing them to bore a hole of progressively increasing diameter. In withdrawing the tool, the collar D is screwed down on the shank so as to close in the cutters to allow them to pass through the mouth of the hole.

What I claim as my invention and desire to secure by Letters Patent is:—

1. In an expanding bit for boring wood, the combination of a disk auger having a gimlet point and a pair of helical cutting lips, a pair of radially adjustable cutters located above said helical auger lips, connecting mechanism which compels the adjustable cutters to always revolve simultaneously with the auger, and means for adjusting said cutters radially.

2. In an expanding bit for boring wood, the combination of a disk auger having a gimlet point and a pair of helical cutting lips, a pair of radially adjustable cutters located above said helical auger lips, connecting mechanism which compels the adjustable cutters to always revolve simultaneously with the auger, and means for adjusting said cutters radially, said movable cutters being also provided with helical cutting lips so located as to form continuations of the helices formed by the disk auger lips.

3. In an expanding brace bit for boring wood, the combination of screw threaded shank B carrying a nut D and binding nut E and a free collar G on said nut D, slot M, fulcrum pin S through said slot, bent opposed cutter levers U fitted to said slot and halved and lapped at the pin S, a disk auger O on the lower end of said shank, cutters W X formed on the lower ends of the levers U and working in a plane rearward of the disk auger O, and links K connecting the cutter levers U to the collar G, substantially as described.

4. In an expanding brace bit for boring wood, a screw threaded and slotted shank carrying a gimlet pointed disk auger head on its lower end, and reduced in diameter immediately above said auger, in combination with a pair of wing cutters of the edge nib and peeling lip type formed on the ends of bent levers housed and fulcrumed on a common pin in the shank slot, a tapped collar carried on the screwed part of the shank, a sleeve rotatable on but fixed axially to said collar, keyways in the shank for preventing rotation of said sleeve in relation to the shank, and articulated connections between said sleeve and cutter levers, substantially as described.

5. In an expanding brace bit for boring wood, a screw threaded and slotted shank carrying a gimlet pointed disk auger head on its lower end, and reduced in diameter immediately above said auger, in combination with a pair of wing cutters of the edge nib and peeling lip type formed on the ends of bent levers housed and fulcrumed on a common pin in the shank slot, and means for expanding said wing cutters radially of the bit.

In testimony whereof I have signed my name to this specification in the presence of two subscribing witnesses.

GEORGE WILLIAM GREEN.

Witnesses:
W. J. DAVIS,
M. J. CANDIUP.